(No Model.)
B. M. MOYER.
FRUIT PICKER.
No. 363,078. Patented May 17, 1887.
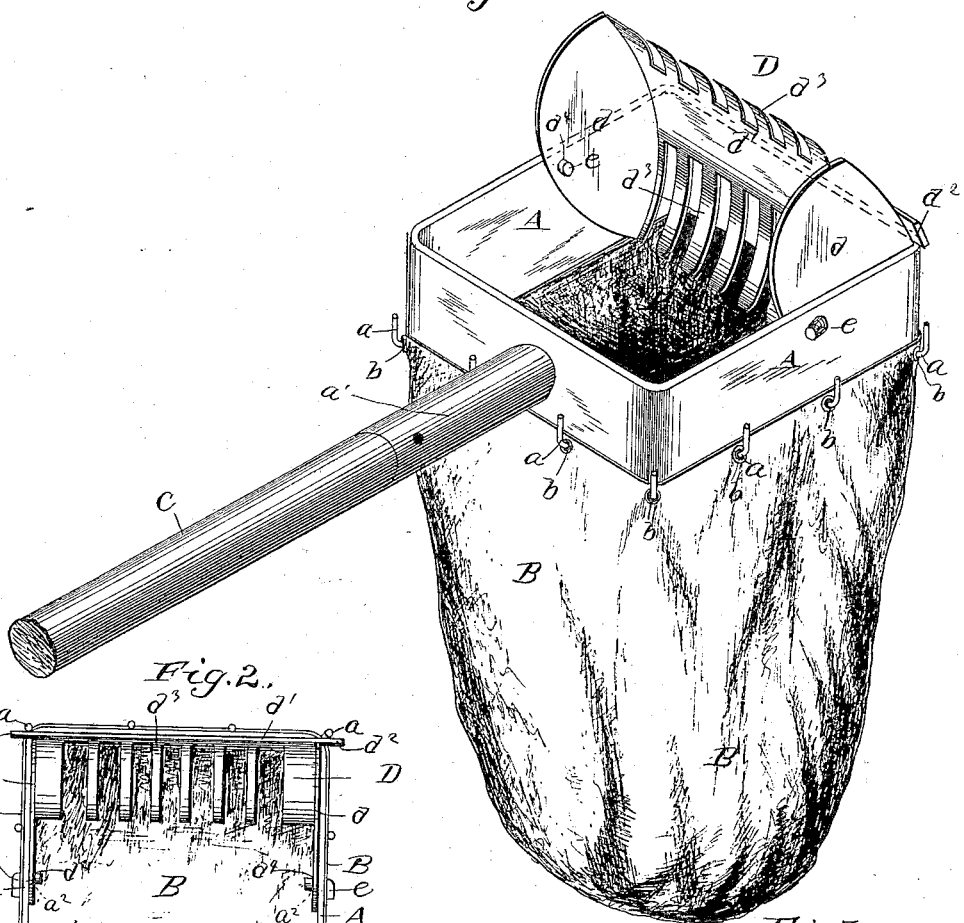
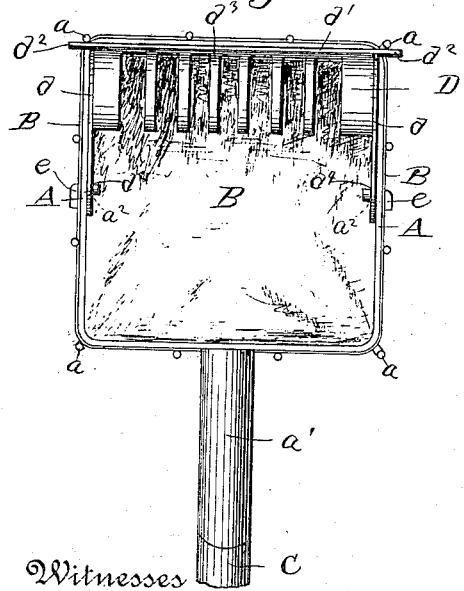
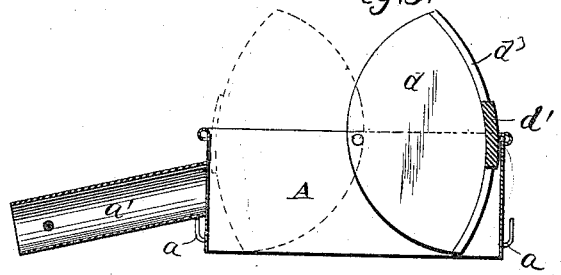
Witnesses
Chas. L. Taylor
E. G. Siggers
Inventor
Benjamin M. Moyer
By his Attorneys

United States Patent Office.

BENJAMIN M. MOYER, OF HATFIELD, PENNSYLVANIA.

FRUIT-PICKER.

SPECIFICATION forming part of Letters Patent No. 363,078, dated May 17, 1887.

Application filed August 13, 1886. Serial No. 210,813. (No model.)

*To all whom it may concern:*

Be it known that I, BENJAMIN M. MOYER, a citizen of the United States, residing at Hatfield, in the county of Montgomery and State of Pennsylvania, have invented a new and useful Improvement in Fruit-Pickers, of which the following is a specification.

My invention relates to devices for picking fruit from fruit-trees; and the novelty of my invention consists in certain peculiar features of construction and arrangement, as hereinafter described and claimed.

In order that my invention may be fully understood, I will proceed to describe it with reference to the accompanying drawings, in which—

Figure 1 is a perspective view of my improved fruit-picker. Fig. 2 is a plan view of the same; and Fig. 3 is a central vertical section thereof with the bag and handle removed.

In the said drawings, A designates an open rectangular metal frame, upon the outer sides of which are placed a series of upturned hooks, $a$, which are designed to enter eyes $b$ in the upper edge of a suitable bag, B. Upon one side of the frame A is placed a socket-piece, $a'$, to receive the upper end of a pole or handle, C.

D designates the picking-frame, which consists of solid end pieces, $d$, connected by a ridge, $d'$, the ends $d^2$ of which project beyond the said side pieces, as shown in Fig. 2. Extending laterally from the ridge $d'$ are two series of picker-fingers, $d^3$, curved in segmental shape, the said picking-frame being formed integrally with its several parts above described.

Upon the two opposite ends of the frame A are formed sockets $a^2$, which receive the bent studs $e$, said studs being set rigidly within the sockets $a^2$, as shown. The inner ends of these studs $e$ enter openings or eyes $d^4$ in the side pieces, $d$, of the picker-frame D, so that said picker-frame D is pivoted upon the main frame A.

From the above construction it will be seen that the fruit may be gathered by either side of the picker-frame, said frame being thrown either way upon its pivots by tilting the main frame A in one or the other direction. The curved fingers $d^3$ are so spaced that leaves or twigs may pass between them without being stripped from the trees, while the fruit is held by said arms and properly picked from the branches.

Either side of the picker-frame D when in use assumes such a position that picked fruit drops directly into the bag without injury; and the entire device is simple, light, and easily handled. It is to be further noted that the extended ends $d^2$ of the pivoted picker-frame serve as stops to limit the throw of said frame in both of its directions, so as to bring the arms $d^3$ into proper operative position.

Having thus described my invention, what I claim as new, and desire to secure by Letters Patent, is—

1. A fruit-picker comprising a main frame, a handle and bag attached thereto, and a picker-frame provided with curved picker-fingers on each side and pivoted in said main frame on transverse pivots, whereby the picker is adapted to engage the stems of the fruit either from the front or rear, substantially as described.

2. In a fruit-picker, the combination, with the approximately-rectangular main frame A, having inwardly-projecting studs $e$ on its opposite sides, and a handle and bag attached to said main frame, of the laterally-pivoted picker-frame D, comprising the end plates, $d$, provided with eyes engaging said studs $e$, a ridge-piece, $d'$, connecting the outer edges of said end plates, and the curved fingers $d^3$, projecting from either edge of said ridge-piece, substantially as described.

3. In a fruit-picker, the combination, with the approximately-rectangular main frame A, having inwardly-projecting studs $e$ on its opposite sides, and a handle and bag attached to said main frame, of the laterally-pivoted picker-frame D, comprising the end plates, $d$, provided with eyes engaging said studs $e$, a ridge-piece, $d'$, connecting the outer edges of the said end plates, its ends $d^2$ projecting beyond said plates, and the curved fingers $d^3$, projecting from either edge of said ridge-piece, substantially as described.

In testimony that I claim the foregoing as my own I have hereto affixed my signature in presence of two witnesses.

BENJAMIN M. MOYER.

Witnesses:
JACOB G. LEIDYS,
SAML. W. MUSSELMAN.